(12) United States Patent　　(10) Patent No.: US 12,216,338 B2
Ben-Haim et al.　　　　　　　　(45) Date of Patent: Feb. 4, 2025

(54) EYEWEAR TETHER

(71) Applicant: Snap Inc., Santa Monica, CA (US)

(72) Inventors: Yoav Ben-Haim, Culver City, CA (US); Varun Sehrawat, Playa Vista, CA (US); Teodor Dabov, Los Angeles, CA (US); John Bernard Ardisana, Torrance, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/606,642

(22) Filed: Mar. 15, 2024

(65) Prior Publication Data

US 2024/0219753 A1　Jul. 4, 2024

Related U.S. Application Data

(63) Continuation of application No. 18/141,661, filed on May 1, 2023, now Pat. No. 11,934,038, which is a
(Continued)

(51) Int. Cl.
*G02C 11/00*　　(2006.01)
*G02C 3/00*　　(2006.01)
(Continued)

(52) U.S. Cl.
CPC ............. *G02C 11/10* (2013.01); *G02C 3/006* (2013.01); *G02C 5/001* (2013.01); *G02C 5/02* (2013.01);
(Continued)

(58) Field of Classification Search
CPC ........ G02C 11/10; G02C 3/006; G02C 5/001; G02C 5/02; G02C 5/14; H01B 7/04;
(Continued)

(56) References Cited

U.S. PATENT DOCUMENTS

| 7,631,968 B1 | 12/2009 | Dobson et al. |
| 11,934,038 B1 | 3/2024 | Ben-Haim et al. |

(Continued)

FOREIGN PATENT DOCUMENTS

| CN | 205608329 U | 9/2016 |
| CN | 208847963 U | 5/2019 |
| JP | 09089968 A | 4/1997 |

OTHER PUBLICATIONS

1st Chinese Office Action (and English Summary) received in Chinese Application No. 202080056948.2, dated Aug. 2, 2023, 14 pages.
(Continued)

*Primary Examiner* — William R Alexander
(74) *Attorney, Agent, or Firm* — CM Law; Stephen J. Weed

(57) ABSTRACT

Eyewear devices including a tether and methods for identifying proper installation of the tether are disclosed. An eyewear device includes transmission lines extending through the temples to electrical and electronic components positioned adjacent to edges of a frame. A tether is attached to the temples to enable power and communication flow between the electrical and electronic components rather than through the frame. Proper installation is identified based on communications passing between the electrical and electronic components via the tether.

20 Claims, 6 Drawing Sheets

Related U.S. Application Data continuation of application No. 16/991,263, filed on Aug. 12, 2020, now Pat. No. 11,650,435.

(60) Provisional application No. 62/887,570, filed on Aug. 15, 2019.

(51) Int. Cl.
　　*G02C 5/00*　　　(2006.01)
　　*G02C 5/02*　　　(2006.01)
　　*G02C 5/14*　　　(2006.01)
　　*H01B 7/04*　　　(2006.01)
　　*H01R 13/62*　　 (2006.01)
　　*H01R 13/658*　　(2011.01)

(52) U.S. Cl.
　　CPC ............... *G02C 5/14* (2013.01); *H01B 7/04* (2013.01); *H01R 13/6205* (2013.01); *H01R 13/658* (2013.01)

(58) Field of Classification Search
　　CPC .... H01B 7/00; H01R 13/6205; H01R 13/658; G02B 27/0176; G02B 2027/014
　　USPC .......................................................... 351/111
　　See application file for complete search history.

(56) References Cited

U.S. PATENT DOCUMENTS

| | | | |
|---|---|---|---|
| 2003/0068057 A1 | 4/2003 | Miller et al. | |
| 2007/0030442 A1 | 2/2007 | Howell et al. | |
| 2013/0077043 A1* | 3/2013 | Moran | G02C 11/00 351/111 |
| 2013/0235332 A1 | 9/2013 | Blum et al. | |
| 2014/0078462 A1* | 3/2014 | Abreu | H04R 1/1016 351/158 |
| 2014/0267005 A1 | 9/2014 | Urbach | |
| 2015/0245131 A1 | 8/2015 | Facteau et al. | |
| 2016/0070110 A1 | 3/2016 | Ushakov | |
| 2016/0223821 A1 | 8/2016 | Seo | |
| 2016/0377891 A1* | 12/2016 | Abreu | G06F 3/167 348/158 |
| 2017/0023971 A1 | 1/2017 | Lee et al. | |
| 2017/0176777 A1 | 6/2017 | Blum et al. | |
| 2017/0249863 A1 | 8/2017 | Murgia et al. | |
| 2017/0265992 A1 | 9/2017 | Blum et al. | |
| 2018/0221137 A1 | 8/2018 | Blum et al. | |
| 2019/0110887 A1 | 4/2019 | Blum et al. | |
| 2019/0314147 A1 | 10/2019 | Blum et al. | |
| 2019/0317551 A1 | 10/2019 | Blum et al. | |
| 2020/0363835 A1 | 11/2020 | Blum et al. | |

OTHER PUBLICATIONS

International Search Report and Written Opinion for International Application No. PCT/US2020/045873, dated Dec. 14, 2020, 17 pages.

Partial International Search Report and Provisional Opinion for International Application No. PCT/US2020/045873, dated Oct. 19, 2020 (Oct. 19, 2020)—13 pages.

European Invitation pursuant to Rule 164(2)(b) and Article 94(3) EPC for EP Application No. 20761088.2 dated Aug. 28, 2024 (Aug. 28, 2024), 11 pages.

* cited by examiner

502 ─↘

602 ─ Generate connection signal

604 ─ Receive connection signal

606 ─ Compare connection signal to affirmative connection value(s)

608 ─ Identify tether is connected responsive to match

702 ─ Compare responsive communication to anticipated communication value(s)

704 ─ Identify proper installation of tether if match between responsive communication and anticipated communication value(s)

FIG. 7

EYEWEAR TETHER

CROSS-REFERENCE TO RELATED APPLICATIONS

This application is a Continuation of U.S. application Ser. No. 18/141,661 filed on May 1, 2023, which is a Continuation of U.S. application Ser. No. 16/991,263 filed on Aug. 12, 2020, now U.S. Pat. No. 11,650,435, which claims priority to U.S. Provisional Application Ser. No. 62/887,570 filed on Aug. 15, 2019, the contents of all of which are incorporated fully herein by reference.

BACKGROUND

Conventional eyewear includes a frame that supports lenses. The frame has a bridge that is configured to receive the nose of the wearer in order to position the frame on the wearer's face such that the lenses are adjacent the eyes of the wearer. The eyewear additionally includes temples extending from the edges of the frame. The temples are configured to engage the ears of the wearer to further support the frame in the proper position on the wearer's face. Eyewear is evolving to include electronics.

BRIEF DESCRIPTION OF THE DRAWINGS

The drawing figures depict one or more implementations, by way of example only, not by way of limitations. In the figures, like reference numerals refer to the same or similar elements.

FIG. 6 is a flow chart of example steps for detecting connection of a tether in a step of FIG. 5;

FIG. 7 is a flow chart of example steps for identifying proper installation of the tether in another step of FIG. 5.

DETAILED DESCRIPTION

In accordance with some examples, an eyewear device is described that includes a tether capable of power transmission, data transmission, or both. The tether attaches to the temples of the eyewear and passes behind the head of the user when worn to create power or data connections between the left and right sides of the eyewear to supplement or replace power or data transmission between the left and right sides of the eyewear through the frame. Electronics positioned in the left/right sides of the eyewear include, by way of non-limiting examples, batteries, light emitting diodes (LEDs), cameras, speakers, microphones, or other electromechanical component necessary. The tether enables power/data to flow between electronics positioned in a left side of the eyewear (e.g., left half of frame or respective temple) and a right side of the eyewear (e.g., right half of frame or respective temple) without having to go through the bridge area of the frame, thereby freeing designers from mechanical constraints, which expand aesthetic options. Additionally, the tether creates manufacturing options. The tether may include a flexible PCB (FPC) or ribbon cable connecting the two sides around the wearer's head from the back. The FPC or cable may additionally include a sheath, e.g., of fabric, woven fabric, flexible plastic, or rubber) to protect the FPC or cable from environmental conditions, as well as prevent it from kinking and damaging the electrical traces/wires/components on the FPC. These and other examples are described below.

Numerous specific details are set forth herein by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
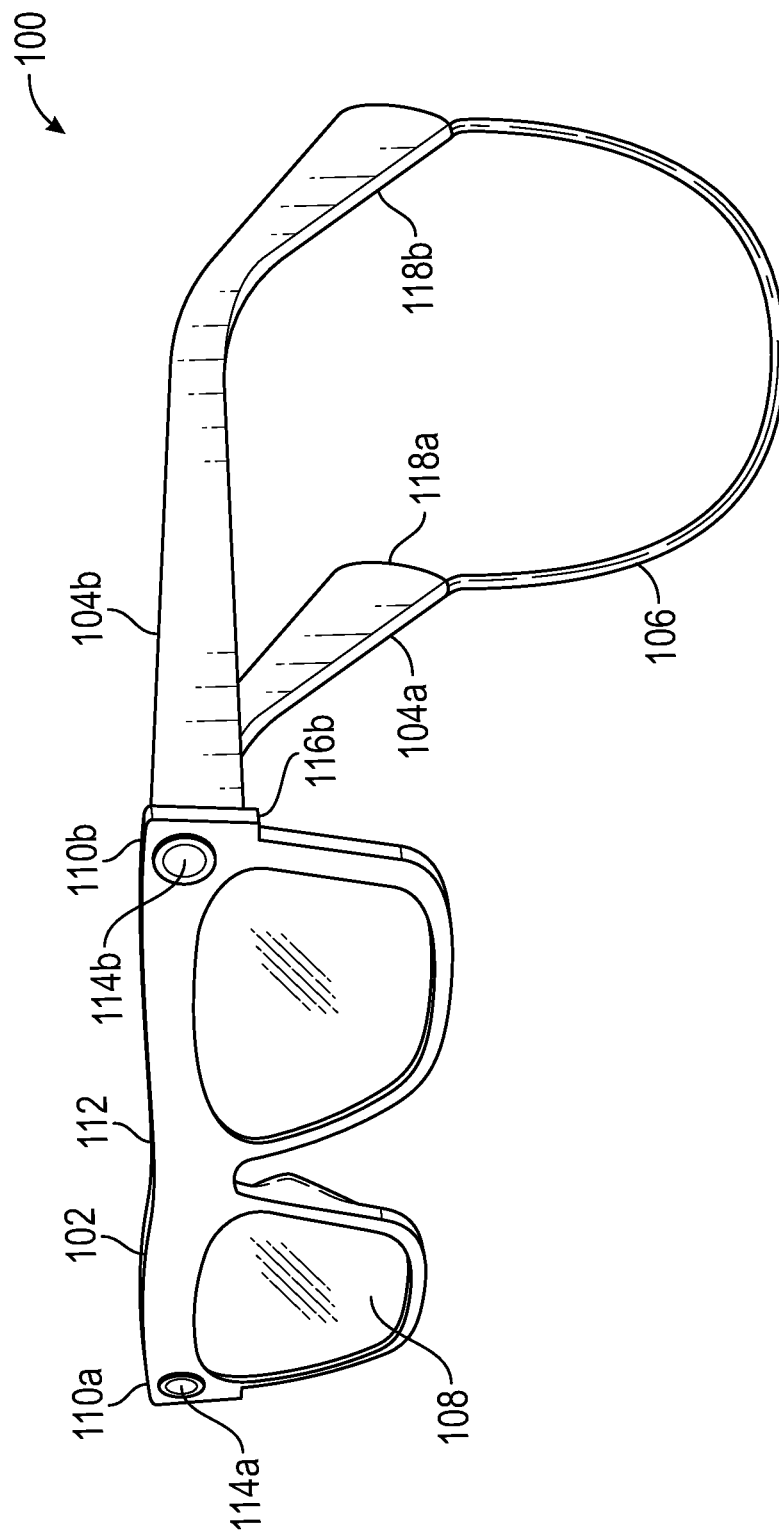
FIG. 1 is a perspective view of an example eyewear device.

FIG. 1 depicts an example eyewear device 100. The eyewear device 100 includes a frame 102, a first temple 104a extending from a first edge 110a of the frame 102, a second temple 104b extending from a second edge 110b of the frame 102, and a tether 106 coupling the first temple 104a to the second temple 104b. The tether 106 can provide power, data, and synchronization signal transmission between the temples 104.

The frame 102 supports one or more optical elements 108 within a field of view of a user/wearer when worn by the user. As used herein, the term "optical elements" refers to lenses, transparent pieces of glass or plastic, projectors, screens, displays and other devices for presenting visual images or through which visual images may be perceived by a wearer. The frame 102 includes a bridge 112 for receiving a nose of the wearer. The frame 102 supports two optical elements 108, one on each side of the bridge 112. The frame 102 additionally supports a first camera 114a and a second camera 114b for capturing images/video.

The first temple 104a includes a proximate end 116a adjacent a first edge 110a of the frame 102 and a distal end 118a. Likewise, the second temple 104b includes a proximate end 116b adjacent a second edge 110b of the frame 102 and a distal end 118b. In an example, the first temple 104a is coupled to the first edge 110a of the frame 102 (e.g., by an articulated joint/hinge) and the second temple 104 is coupled to the second edge 110b of the frame 102 in the same manner. In another example, the temples 104 are integrally formed with frame 102.

In an example, the frame 102 and temples 104 are constructed of a plastics material, cellulosic plastic (e.g., cellulosic acetate), an eco-plastic material, a thermoplastic material, or the like. Core wires (not shown) may be embedded within the frame 102 or temples 104. The core wires provide structural integrity and act as a heat sink to transfer heat generated by electronic components (described below) with the frame/temples to reduce the likelihood of localized heating adjacent electronic components. The core wires may be constructed of a relatively flexible conductive metal or metal alloy material such as one or more of an aluminum, an alloy of aluminum, alloys of nickel-silver, and a stainless steel, for example. In other examples, the frame 102, temples 104, or both are formed substantially of metal or a metal alloy.

Figure 2A:
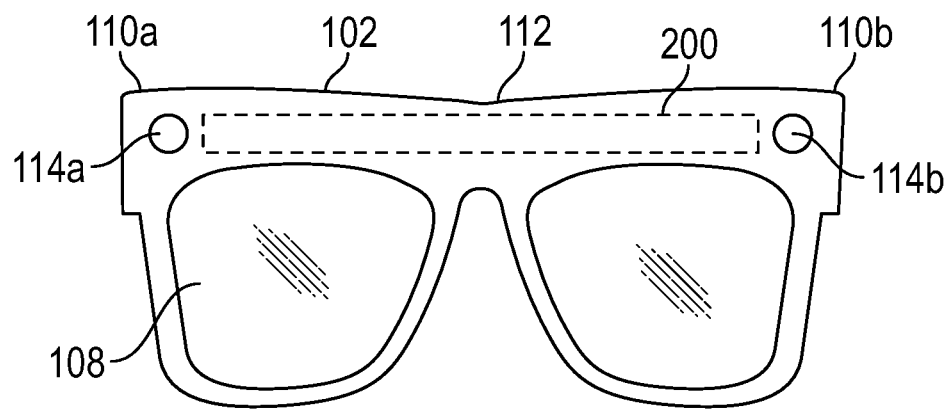
FIG. 2A is a front view of a frame of the eyewear device of FIG. 1.

FIG. 2A depicts a front view of the frame 102. The frame 102 includes a transmission line 200. The transmission line 200 includes one or more conductive lines (e.g., traces on a flexible printed circuit board) extending through the bridge 112 between electronic components (e.g., cameras 114 and associated processing circuitry) adjacent the edges 110 of the frame 102. In some examples, all power and communications between the edges 110 of the frame 102 pass through the temples 104 (FIG. 1). In these examples, the transmission line 200 may be omitted.

Figure 2B:
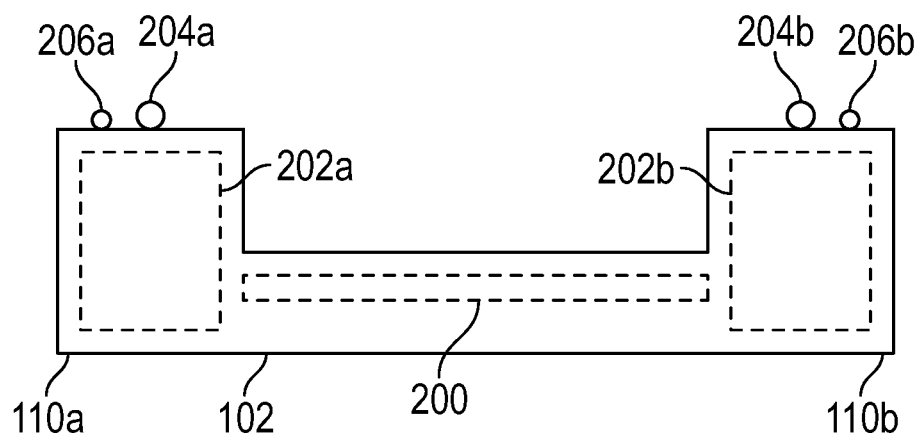
FIG. 2B is a top view of the frame of the eyewear device of FIG. 2A.

FIG. 2B is a top view of the frame 102. The frame 102 supports electrical/electronic components 202a and 202b near respective edges 110a and 110b of the frame. Example components 202 includes cameras 114, projectors, indicators, processors, memory, transceivers (TX/RX, with both TX and RX combined in a single component or implemented as separate components), etc. Suitable cameras, projectors, indicators, processors, memory, and TX/RXs will be understood by one of skill in the art from the description herein. In an example, the processors are configured to communicate with one another through the transceivers via the tether.

Figure 3:
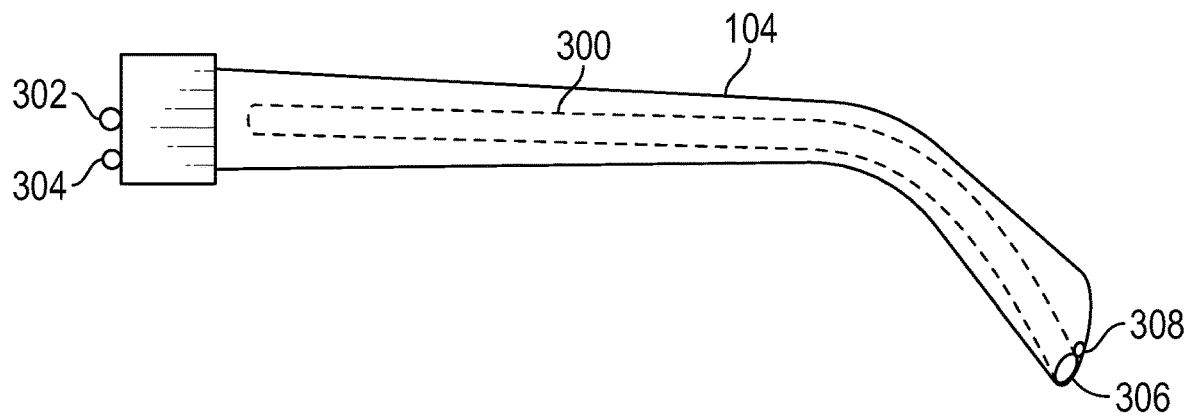
FIG. 3 is a side view of an example temple.

The frame 102 supports a first hinge component 204a and a second hinge component 204b for mating with hinge components on respective temples 104. The frame 102 additionally includes a first electrical contact 206a and a second electrical contact 206b. The first electrical contact 206a is coupled to transmission line 200 and components 202a and the second electrical contact 206b is coupled to transmission line 200 and components 202b. The electrical contacts are configured and positioned to engage mating electrical contacts (contacts 304; FIG. 3) on the respective temples 104 when the temples 104 are rotated about the hinges 204 in a wearable condition.

FIG. 3 depicts an example temple 104. The temple 104 includes a transmission line 300 including one or more conductive lines (e.g., traces on a flexible printed circuit board) extending through the temple 104. The temple 104 also includes a mating hinge component 302 configured to mate with respective hinge components 204 on the frame 102 and a fitting 306 (e.g., magnetic or friction fit component) configured and positioned to physically engage an end of the tether 106. The temple 104 additionally includes an electrical contact 304 coupled to the transmission line 300 adjacent the proximate end 116 of the temple 104 and an electrical contact 308 coupled to the transmission line 300 adjacent the distal end 118 of the temple 104 such that the electrical contacts 304/308 are interconnected via the transmission line 300.

In the illustrated example, the mating hinge component 302 and electrical contact 304 are configured and positioned such that electrical contact is established between the contact 206 of the frame and the contact 304 of the temple 104 when the temple 104 is rotated into a wearable condition about the hinge components 204/302. In alternative examples, the electrical contacts 206/304 may be interconnected by a ribbon cable or other conductor such that they are in contact in both the wearable condition and a folded condition. Additionally, although FIGS. 1, 2A, 2B, and 3 show electrical/electronic components 202 positioned in and supported by the frame 102, some or all of the electrical/electronic components 202 may be positioned in and supported by the temples 104. Furthermore, although one transmission line and contact is illustrated, additional transmission lines and contacts may be present (e.g., a power transmission line/contact, a ground transmission line/contact, a positive (+) data transmission line/contact, a negative (−) data transmission line/contact, and a clock synchronization transmission line/contact).

Figure 4A:
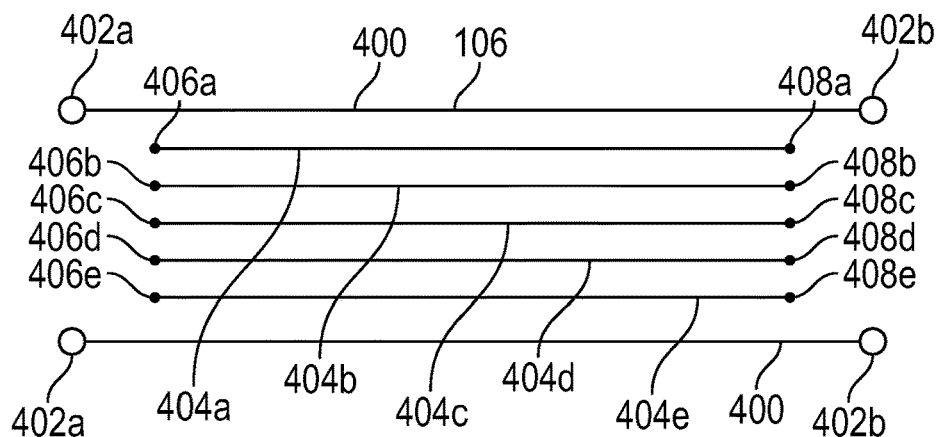
FIG. 4A is a cross-sectional view of an example tether.

FIG. 4A depicts a cross-section of an example tether 106. The tether 106 includes a sheath 400. The sheath 400 may be flexible material such as fabric, woven fabric, flexible plastic, or rubber, to protect transmission lines surrounded by the sheath 400. A first connector 402a of the tether 106 is positioned on the sheath 400 adjacent a first end of the tether 106, e.g., to engage a fitting 306 of a temple 104 of an eyewear device 100. Likewise, a second connector 402b of the tether 106 is positioned adjacent on the sheath 400 adjacent a second end of the tether 106, e.g., to engage a fitting 306 of the other temple 104 of the eyewear device 100.

The tether 106 includes five transmission lines 404a-e surrounded by the sheath 400. Each transmission line 404a-e includes respective first electrical contacts 406a-e adjacent a first end of the tether 106 for engaging corresponding contacts 308 of a temple 104 and respective second electrical contacts 408a-e for engaging corresponding contacts 308 of the other temple 104. A first transmission line 404a may be a power transmission line, a second transmission line 404b may be a ground transmission line, a third transmission line 404c may be a positive (+) data transmission line, a fourth transmission line 404d may be a negative (−) data transmission line, and a fifth transmission line 404e may be a clock synchronization transmission line. More or fewer transmission lines may be included within the sheath 400.

The electrical contacts 304/306 may be grouped within a connector. The connector may be a standard connector such as a universal serial bus (USB) type B or type C connector or a proprietary connector. The corresponding connectors 308 of the temples 104 are configured to mate with the connectors of the tether 106.

In one example, the tether 106 is permanently affixed to the temples 104. In accordance with this example, the contacts may be the transmission line carrying the power/signal. In other examples, at least one of the ends of the tether 106 may be removed from a respective temple 104. In accordance with this example, the tether can be completely removed or one end of the tether 106 may be removed to expose the corresponding contacts, e.g., for providing access for charging electrical/electronic components within the eyewear temple 104 or frame 102.

Figure 4B:
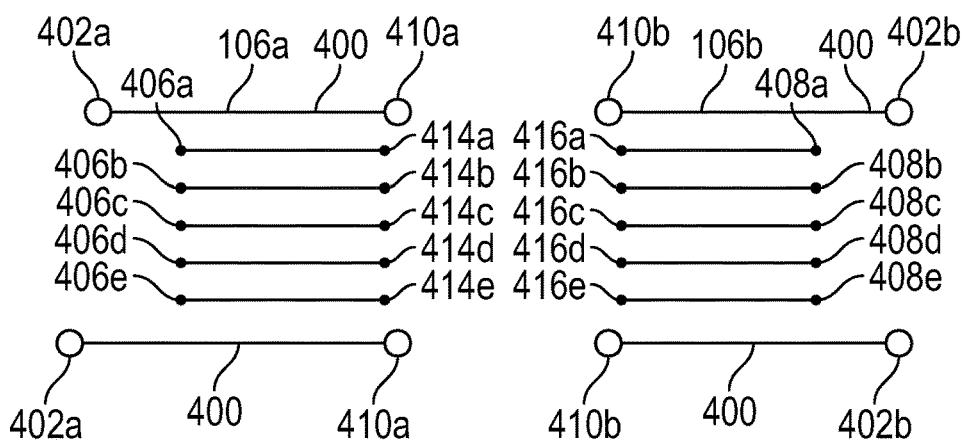
FIG. 4B is a cross-sectional view of another example tether.

FIG. 4B illustrates another example tether 106. The illustrated tether 106 includes a first tether portion 106a and a second tether portion 106b. The two portions may include mating connectors 410a/410b (e.g., magnetic or friction fit for interconnecting the sheath 400) and respective contacts 414a-e/416a-e for interconnecting the transmission lines. The electrical contacts 414a-e/416a-e may be grouped within mating connectors, e.g., standard connector such as USB type B or type C connector or a proprietary connector. In accordance with this example, a portion of the tether 106a, b may be permanently fixed to the respective temples 104 and connected/disconnected by the wearer to facilitate putting on and removal of the eyewear device 100.

Figure 5:
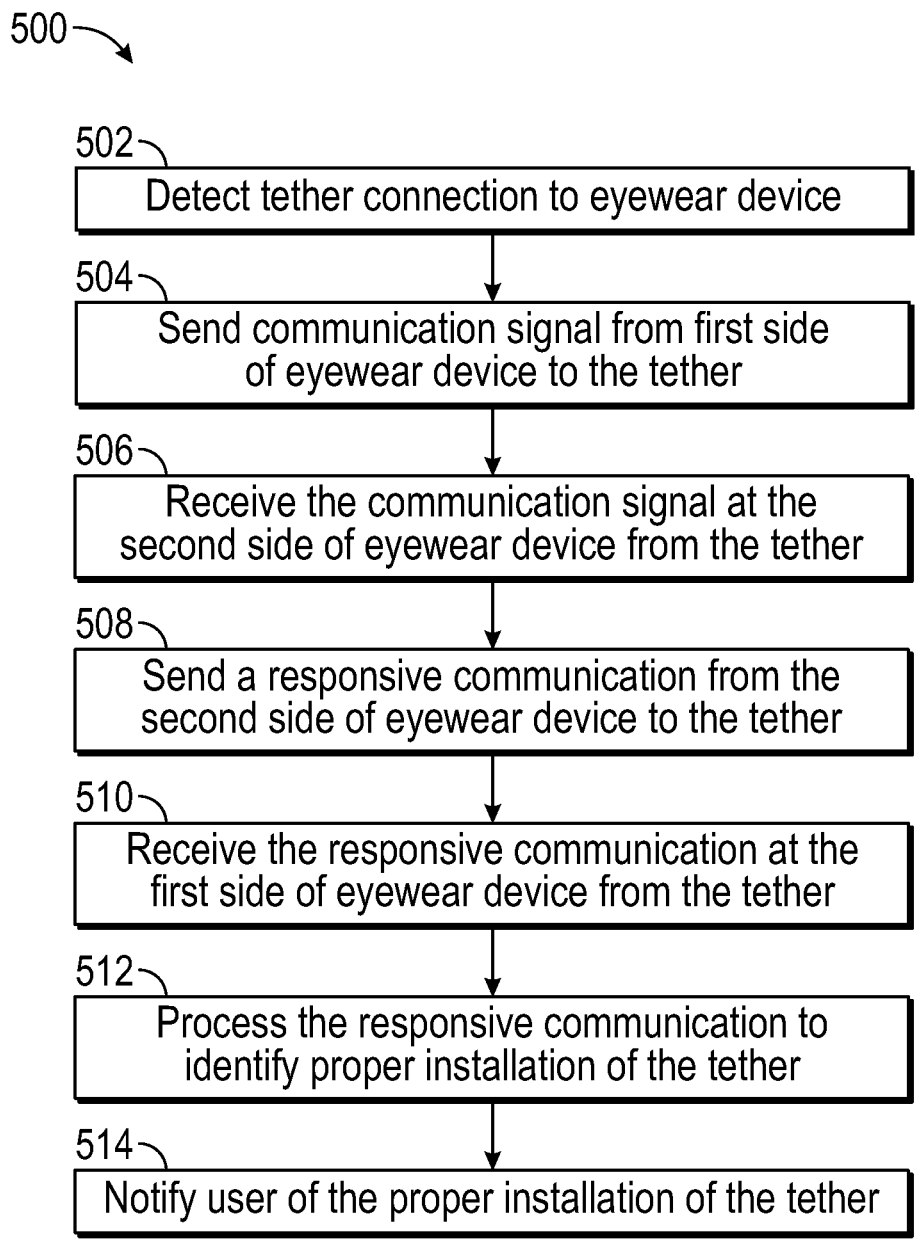
FIG. 5 is a flow chart of example steps confirming proper installation of a tether to eyewear.

FIGS. 5-7 depict example methods 500 for identifying proper installation of a tether for the eyewear device 100. Although shown as occurring serially, the blocks of FIGS. 5-7 may be reordered or parallelized depending on the implementation. Additionally, one or more of the blocks may be omitted. Furthermore, although the methods are described with reference to the eyewear device 100 described herein, the methods may be implemented using other eyewear devices.

Figure 8:
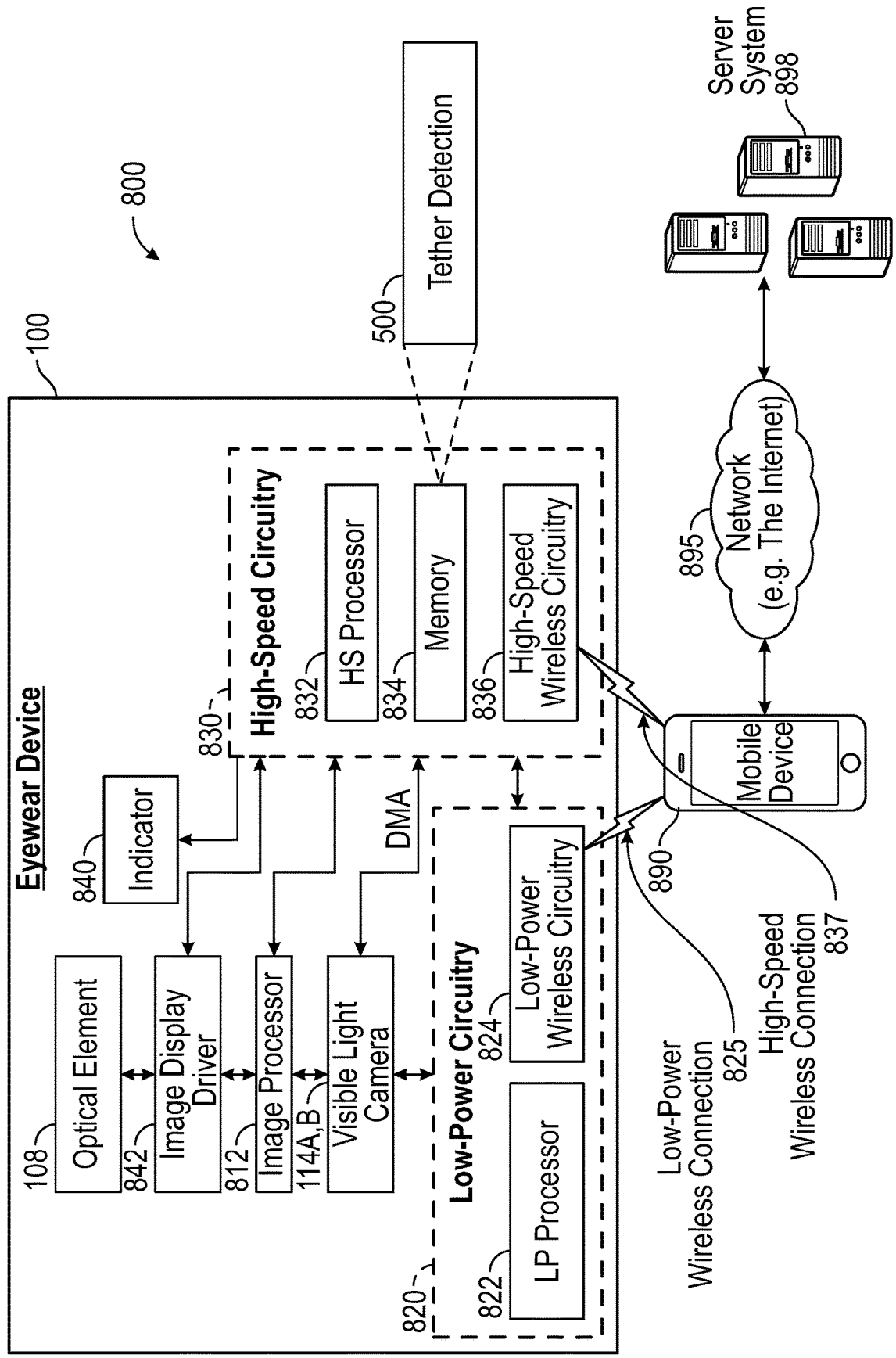
FIG. 8 is a block diagram of example electronics of an eyewear device and connections of the eyewear device with other components.

At block 502, detect tether connection to the eyewear device. In an example, a processor (e.g., processor 822 or processor 832; FIG. 8) detects connection of the tether (e.g., the first mating connector of the tether to a first connector of a temple of the eyewear). The processor detects the connection responsive to a signal from a connector in the temple adjacent the distal end of the temple. In one example, the detector may be electro-magnetic detector that detects a change in the magnetic field when the mating connector of the tether is brought into contact with the temple. In another example, the detector may be a pair of wires that are interconnected to complete a circuit when the mating connector of the tether is brought into contact with a connector in the temple. In accordance with this example, the processor may periodically measure resistance and detect connection when the measured resistance matches a known value or may periodically send a signal and detect connection when a responsive signal is received.

FIG. 6 depicts an example method for detecting connection of a tether in the method of FIG. 5. At block 602, a connection signal is generated. A detector (such as an electromagnetic sensor) positioned adjacent the distal end of a temple may generate a signal when the tether is brought into contact with the tether in the vicinity of the detector. At block 604, receive the connection signal. The processor of the eyewear device may receive the generated connection signal from the detector. At block 606, compare the connection signal to a known affirmative connection value or range of values. The processor may compare the connection signal to a value or range of values stored in a memory accessible to the processor. At block 608, identify the tether is connected responsive to a match with the affirmative connection value or range of values. The processor may identify the connection in response to identifying a match with the affirmative connection value or range of values.

Referring back to FIG. 5, at block 504, send a communication signal from the first side of the eyewear device to the tether. In an example, the processor in a first side of the eyewear (e.g., the left or the right side) sends (via a corresponding transceiver) to the tether, a communication signal responsive to detection of the connection of the tether.

At block 506, receive the communication signal at the second side of eyewear device from the tether. In an example, the processor in a second side of the eyewear (e.g., the right or the left side) receives (via a corresponding transceiver) the communication signal from the tether.

At block 508, send a responsive communication from the second side of the eyewear to the tether. In an example, the processor in the second side sends (via the corresponding transceiver) a responsive communication to the tether. In accordance with this example, the processor processes and compares the received communication signal from the first side of the eyewear, generates a responsive communication, and sends the responsive communication.

At block 510, receive the responsive communication at the first side of eyewear device from the tether. In an example, the first processor in the first side receives (via the corresponding transceiver) the responsive communication from the tether.

At block 512, process the responsive communication to identify proper installation of the tether. In an example, the first processor processes the responsive communication from the tether to identify proper installation. Identification of proper installation may include comparing the responsive communication to an anticipated communication value(s) (blocks 702; FIG. 7) and identifying proper installation of the tether if there is a match between the responsive communication and the anticipated communication values(s) (block 704). If there is not a match between the responsive communication and the anticipated communication values (s) it may be determined by the processor that the installation was unsuccessful/improper.

At block 514, notify the user of the proper installation of the tether. In an example, the processor controls the notifications to the user. Notification of proper installation may include illuminating a green LED on the eyewear or the tether, verbally presenting dialog such as "tether properly installed" via a speaker (not shown), or presenting an image or text indicating proper installation on the optical element 108. Notification of improper installation may also be presented. Notification of improper installation may include illuminating a red LED, verbally presenting dialog such as "tether not properly installed" via a speaker (not shown), or presenting an image or text indicating improper installation on the optical element 108.

FIG. 8 depicts a high-level functional block diagram including example electronic components disposed in the eyewear device 100. The illustrated electronic components include a processor 832 and a memory 834, which includes static memory, dynamic memory, or a combination thereof. Each side of the eyewear device 100 may include one or more of the electronic components. Some of the components (such as a processor) may or may not be present in both sides while other components (such as wireless circuitry) may or may not be present only in one side.

Memory 834 includes instructions for execution by processor 832 to implement functionality of eyewear device 100 including instructions for processor 832 to detect connection of a tether and identify proper installation of the tether. Processor 832 receives power from battery (not shown) and executes instructions stored in memory 834, or integrated with the processor 832 on-chip, to perform functionality of eyewear device 100 such as image processing for optical element 108, controlling operation of eyewear device 100, and communicating with external devices via wireless connections.

The eyewear device 100 may form part of a system 800 by communicating with a mobile device 890 and a server system 898 connected via various networks. Mobile device 890 may be a smartphone, tablet, laptop computer, access point, or any other such device capable of connecting with eyewear device 100 using both a low-power wireless connection 825 and a high-speed wireless connection 837. Mobile device 890 is connected to server system 898 and network 895. The network 895 may include any combination of wired and wireless connections.

Eyewear device 100 includes at least two visible light cameras 114A, B (one associated with the left side and one associated with the right side). Eyewear device 100 further includes two optical elements 108A, B (one associated with the left side and one associated with the right side) and an indicator 840 such as one or more light emitting diodes (LED). Eyewear device 100 also includes image display driver 842, image processor 812, low-power circuitry 820, and high-speed circuitry 830. The components shown in FIG. 8 for the eyewear device 100 are located on one or more circuit boards, for example a PCB or flexible PCB, in the temples. Alternatively, or additionally, the depicted components can be located in the housings, frames, hinges, or bridge of the eyewear device 100. Left and right visible light cameras 114A, B can include digital camera elements such as a complementary metal-oxide-semiconductor (CMOS) image sensor, charge coupled device, a lens, or any other respective visible or light capturing elements that may be used to capture data, including images of scenes with unknown objects.

As shown in FIG. 8, high-speed circuitry 830 includes high-speed processor 832, memory 834, and high-speed wireless circuitry 836. In the example, the image display driver 842 is coupled to the high-speed circuitry 830 and operated by the high-speed processor 832 in order to drive the left and right optical elements 108A, B. High-speed processor 832 may be any processor capable of managing high-speed communications and operation of any general computing system needed for eyewear device 100. High-speed processor 832 includes processing resources needed for managing high-speed data transfers on high-speed wireless connection 837 to a wireless local area network (WLAN) using high-speed wireless circuitry 836. In certain examples, the high-speed processor 832 executes an operating system such as a LINUX operating system or other such operating system of the eyewear device 100 and the operating system is stored in memory 834 for execution. In addition to any other responsibilities, the high-speed processor 832 executing a software architecture for the eyewear device 100 is used to manage data transfers with high-speed wireless circuitry 836. In certain examples, high-speed wireless circuitry 836 is configured to implement Institute of Electrical and Electronic Engineers (IEEE) 802.11 communication standards, also referred to herein as Wi-Fi. In other examples, other high-speed communications standards may be implemented by high-speed wireless circuitry 836.

Low-power wireless circuitry 824 and the high-speed wireless circuitry 836 of the eyewear device 100 can include short range transceivers (Bluetooth™) and wireless wide, local, or wide area network transceivers (e.g., cellular or WiFi). Mobile device 890, including the transceivers communicating via the low-power wireless connection 825 and high-speed wireless connection 837, may be implemented using details of the architecture of the eyewear device 100, as can other elements of network 895.

Memory 834 includes any storage device capable of storing various data and applications, including, among other things, color maps, camera data generated by the left and right visible light cameras 114A, B and the image processor 812, as well as images generated for display by the image display driver 842 on the optical elements 108. While memory 834 is shown as integrated with high-speed circuitry 830, in other examples, memory 834 may be an independent standalone element of the eyewear device 100. In certain such examples, electrical routing lines may provide a connection through a chip that includes the high-speed processor 832 from the image processor 812 or low-power processor 822 to the memory 834. In other examples, the high-speed processor 832 may manage addressing of memory 834 such that the low-power processor 822 will boot the high-speed processor 832 any time that a read or write operation involving memory 834 is needed.

Server system 898 may be one or more computing devices as part of a service or network computing system, for example, that include a processor, a memory, and network communication interface to communicate over the network 895 with the mobile device 890 and eyewear device 100. Eyewear device 100 may be connected with a host computer. For example, the eyewear device 100 is paired with the mobile device 890 via the high-speed wireless connection 837 or connected to the server system 898 via the network 895.

Output components of the eyewear device 100 include visual components, such as the left and right optical elements 108A, B (e.g., see-through display, a display such as a liquid crystal display (LCD), a plasma display panel (PDP), a light emitting diode (LED) display, a projector, or a waveguide). The optical elements 108 may be driven by the image display driver 842. The output components of the eyewear device 100 further include acoustic components (e.g., speakers), haptic components (e.g., a vibratory motor), other signal generators, and so forth. The input components of the eyewear device 100, the mobile device 890, and server system 898, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, indicators, or any other such elements described herein.

For example, biometric components may be used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 825 and 837 from the mobile device 890 via the low-power wireless circuitry 824 or high-speed wireless circuitry 836.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

The terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device comprising:
   a frame configured to support an optical element;
   a first temple coupled to the frame, the first temple including a first connector, a first transceiver, and a first processor;
   a second temple coupled to the frame, the second temple including a second connector, a second transceiver, and a second processor; and
   a tether including a first mating connector on a first end coupled to the first connector and a second mating connector on a second end coupled to the second connector;
   wherein the first processor is configured to:
   send, via the first transceiver and the first connector to the tether, a communication signal for delivery to the second processor;
   receive, from the tether via the first connector and the first transceiver, a responsive communication signal from the second processor via the second transceiver and the second connector; and
   process the responsive communication signal to identify proper installation of the tether to the first and the second temples.

2. The eyewear device of claim 1, wherein:
   the first processor and the first transceiver are positioned in the first temple or in the frame adjacent a first edge of the frame; and
   the second processor and the second transceiver are positioned in the second temple or the frame adjacent a second edge of the frame.

3. The eyewear device of claim 2, wherein the first processor and the first transceiver are positioned in the frame adjacent the first edge, the eyewear device further comprising:
   a first data line and a first synchronization line extending from the first transceiver to a distal end of the first temple.

4. The eyewear device of claim 1, wherein:
   the second processor is configured to receive the communication signal from the tether, generate the responsive communication signal, and send the responsive communication signal to the tether.

5. The eyewear device of claim 1, further comprising a notification device supported by at least one of the frame, the first temple, the second temple, or the tether and wherein the first processor is configured to notify a user via the notification device when proper installation of the tether to the eyewear device is identified.

6. The eyewear device of claim 1, wherein the tether is detachably coupled to at least one of the first and second temples.

7. The eyewear device of claim 1, wherein the first temple includes a connector selected from the group consisting of a universal serial bus (USB) connector, a friction fit connector, and a magnetic attachment connector and the tether includes a mating connector selected from the group consisting of a USB connector, a friction fit connector, and a magnetic attachment connector.

8. The eyewear device of claim 1, wherein the tether includes a data line and a synchronization line extending between the first and second mating connectors and a flexible sheath surrounding the data line and the synchronization line.

9. The eyewear device of claim 8, wherein the flexible sheath is selected from the group consisting of silicone, a thermoplastic elastomer, and a fabric.

10. The eyewear device of claim 8, wherein the tether further comprises:
    a power transmission line, the flexible sheath further surrounding the power transmission line.

11. The eyewear device of claim 1, wherein the frame includes a bridge between a first edge of the frame and a second edge of the frame and wherein there are no transmission lines that pass through the bridge.

12. A tether for use with an eyewear device including a frame configured to support an optical element, a first temple coupled to the frame, the first temple including a first connector, a first transceiver, and a first processor, a second temple coupled to the frame, the second temple including a second connector, a second transceiver, and a second processor, the tether comprising:
    a first mating connector on a first end coupled to the first connector; and a second mating connector on a second end coupled to the second connector;

wherein the tether is configured to:
    receive, from the first connector via the first mating connector, a communication signal for delivery to the second processor;
    send, to the second connector via the second mating connector, the communication signal for delivery to the second processor via the second transceiver;
    receive, from the second connector via the second mating connector, a responsive communication signal for delivery to the first processor; and
    send, to the first connector via the first mating connector, the responsive communication signal for delivery to the first processor via the first transceiver for processing to identify proper installation of the tether to the first and the second temples.

13. The tether of claim 12, wherein the first temple includes a connector selected from the group consisting of a universal serial bus (USB) connector, a friction fit connector, and a magnetic attachment connector and the mating connector of the tether is selected from the group consisting of a USB connector, a friction fit connector, and a magnetic attachment connector.

14. The tether of claim 12, wherein the tether includes:
    a data line extending between the first and second mating connectors;
    a synchronization line extending between the first and second mating connectors; and
    a flexible sheath surrounding the data line and the synchronization line.

15. The tether of claim 14, wherein the flexible sheath is selected from the group consisting of silicone, a thermoplastic elastomer, and a woven fabric.

16. The tether of claim 14, wherein the tether further comprises:
    a power transmission line, the flexible sheath further surrounding the power transmission line.

17. The tether of claim 12, wherein the tether is configured to be detachably coupled to at least one of the first and second connectors via at least one of the first and second mating connectors.

18. A non-transitory computer readable medium including instructions for configuring an eyewear device that is configured to communicate via a tether, the eyewear device including a frame configured to support an optical element, a first temple coupled to the frame, the first temple including a first connector, a first transceiver, and a first processor, and a second temple coupled to the frame, the second temple including a second connector, a second transceiver, and a second processor, the tether including a first mating connector on a first end coupled to the first connector and a second mating connector on a second end coupled to the second connector, the instructions, when executed by at least one of the first processor or the second processor configuring the eyewear device to perform steps comprising:
    sending, via the first transceiver and the first connector to the tether, a communication signal for delivery to the second processor;
    receiving, from the tether via the first connector and the first transceiver, a responsive communication signal from the second processor via the second transceiver and the second connector; and
    processing, by the first processor, the responsive communication signal to identify proper installation of the tether to the first and the second temples.

19. The non-transitory computer readable medium of claim 18, wherein the instructions, when executed by the at least one of the first processor or the second processor further configuring the eyewear device to perform the step of:
    notifying a user of the eyewear device of the installation of the tether on the eyewear device.

20. The non-transitory computer readable medium of claim 18, wherein the instructions, when executed by the at least one of the first processor or the second processor further configuring the eyewear device to perform the step of:
    receiving, by the second processor, the communication signal from the tether,
    generating, by the second processor, the responsive communication signal, and
    sending, by the second processor via the second transceiver, the responsive communication signal to the tether.

* * * * *